US006624413B1

(12) United States Patent
Klein

(10) Patent No.: US 6,624,413 B1
(45) Date of Patent: Sep. 23, 2003

(54) CORONA TREATMENT APPARATUS WITH SEGMENTED ELECTRODE

(75) Inventor: Kenneth J. Klein, Oxford, WI (US)

(73) Assignee: QC Electronics, Inc., Portage, WI (US)

( * ) Notice: Subject to any disclaimer, the term of this patent is extended or adjusted under 35 U.S.C. 154(b) by 0 days.

(21) Appl. No.: 10/292,266

(22) Filed: Nov. 12, 2002

(51) Int. Cl.[7] ........................ H01T 19/04; G01N 23/04; H05F 3/00; B01J 19/08

(52) U.S. Cl. ........................ 250/324; 250/325; 250/326; 250/492.3; 250/587; 250/589; 422/186.04; 422/186.05; 361/213; 361/214; 361/225; 361/229; 361/230

(58) Field of Search ................................ 250/324–326, 250/492.3, 587, 589; 422/186.04, 186.05; 361/213–214, 225, 229, 230

(56) References Cited

U.S. PATENT DOCUMENTS 3,409,537 A 11/1968 Cannon
3,660,656 A * 5/1972 Frank et al. ................ 250/326
3,691,373 A * 9/1972 Compton et al. ........... 250/326
3,834,809 A 9/1974 Yoshizawa et al.
3,914,521 A * 10/1975 Beatty et al. ............... 428/461
4,088,891 A * 5/1978 Smith et al. ................ 250/324
4,112,299 A 9/1978 Davis
4,189,643 A * 2/1980 Wieloch ..................... 250/326
4,286,166 A * 8/1981 Glukhikh et al. ........ 250/492.3
4,446,110 A 5/1984 Ahlbrandt
4,446,371 A * 5/1984 Cobb ......................... 250/324
4,514,781 A 4/1985 Plasschaert et al.
4,533,523 A * 8/1985 Ahlbrandt .............. 422/186.05
4,556,544 A 12/1985 Ahlbrandt
4,556,795 A 12/1985 Tietje
4,571,052 A * 2/1986 Shirai ......................... 399/310
4,627,701 A 12/1986 Onoda et al.
4,684,803 A 8/1987 Collins
4,754,305 A 6/1988 Fantuzzo et al.
4,770,858 A 9/1988 Collins
4,940,894 A 7/1990 Morters
5,516,473 A * 5/1996 Bakeev et al. .............. 264/154
5,906,798 A 5/1999 Schuelke et al.
6,297,599 B1 10/2001 Dirscherl et al.

OTHER PUBLICATIONS

"Electrode Assembly Covered Roll," 2000, Q. C. Electronics, Inc.

"Corona Treating Electrodes", Solo Systems, Inc. Garland, TX.

* cited by examiner

*Primary Examiner*—John R. Lee
*Assistant Examiner*—Bernard E. Souw
(74) *Attorney, Agent, or Firm*—Stiennon & Stiennon

(57) ABSTRACT

A corona treating apparatus has an electrically conductive electrode housing with a downwardly opening channel, within which are adjustably positioned a number of conductive electrode segments. Each segment has a stem which extends into the channel, and a foot which extends below the channel and which overlies an electrically conductive electrode roller, over which the material to be treated travels. Top springs extend into bores in the top of the electrode segments, and ball detents extend through the housing to urge against slots on one side of the segments. Each electrode segment stem has a first lip which engages with an upper ledge when the segment is in a retracted position, and a second lip which engages with a lower ledge on the opposite wall when the segment is in an active position. Pushing upwardly on one sideward flange of an electrode foot readily changes the position of each segment.

13 Claims, 3 Drawing Sheets

CORONA TREATMENT APPARATUS WITH SEGMENTED ELECTRODE

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to corona treatment apparatus in general, and to adjustable electrode arrangements for corona treatment apparatus in particular.

Often a substrate will be selected for use in some practical application based on desirable material properties or economic efficiencies. At times, however, where it is necessary to imprint or coat the selected substrate, difficulties may arise in causing the ink, paint, dye, adhesive or other coating to adhere to the substrate. This is often the case, for example when printing on plastic films.

While the plastic film may have desirable qualities of durability, flexibility, and capability for forming an airtight package, many plastic substrates are unsuitable for conventional printing techniques in an untreated condition.

The corona treating apparatus positions an electrically conductive emitting electrode in close proximity to a substrate web as it travels over a conductive electrode roller. An AC current is discharged from the emitting electrode, and passes through the substrate to the electrode roller. In the process, portions of the substrate surface are ionized and thereby caused to bond with atmospheric oxygen molecules. When a substrate such as a plastic film passes through the corona, ions cross-link a positive free radical to the surface of the substrate. The regions of the surface so treated are made, for a time, receptive to bonding with the coating which is applied shortly after the corona treatment.

Corona treatment is used in the preparation of packaging, labels, plastic articles, and other common products. Because it is only necessary to treat those regions of the substrate which will receive printing or coating, it is desirable to curtail corona discharge in those regions where treatment is not required. Moreover, heat sealing of plastic is difficult or impractical once a region has been corona treated. Corona discharge activity can be avoided by increasing the distance between the emitting electrode and the electrode roller, often by only fractions of an inch.

Segmented electrodes have been employed in corona treatment apparatus which have segments which are held in a non-active condition by a friction fit by being clamped between two channels. However, there is the possibility that segments held in a friction fit can come loose as a result of vibrations over time.

What is needed is a corona treating apparatus in which the electrode spacing from the substrate may be conveniently and expeditiously adjusted along the length of the electrode.

SUMMARY OF THE INVENTION

The corona treating apparatus of this invention has an electrically conductive electrode housing with a downwardly opening channel, within which are adjustably positioned a number of conductive electrode segments. The segments have a stem which extends into the channel, and a foot which extends below the channel and which overlies an electrically conductive electrode roller, over which the material to be treated travels. Top springs extend into bores in the top of the electrode segments, and ball detents extend through the housing to urge against slots on one side of the segments. Each electrode segment stem has two upper lips, a first lip which engages with an upper ledge when the segment is in a retracted position, and a second lip which engages with a lower ledge on the opposite wall when the segment is in an active position. By pushing upwardly on one sideward flange of an electrode foot, the user readily changes the position of each segment.

It is an object of the present invention to provide an electrode for a corona treatment apparatus which is readily configured to treat different sized substrates.

It is another object of the present invention to provide an electrode for a corona treatment apparatus which is adjustable by hand to treat or not treat axial lengths of a substrate running therebeneath.

It is also an object of the present invention to provide a segmented electrode for a corona treatment apparatus in which the electrode segments are independently adjustable.

Further objects, features and advantages of the invention will be apparent from the following detailed description when taken in conjunction with the accompanying drawings.

DESCRIPTION OF THE PREFERRED EMBODIMENTS

Figure 1:
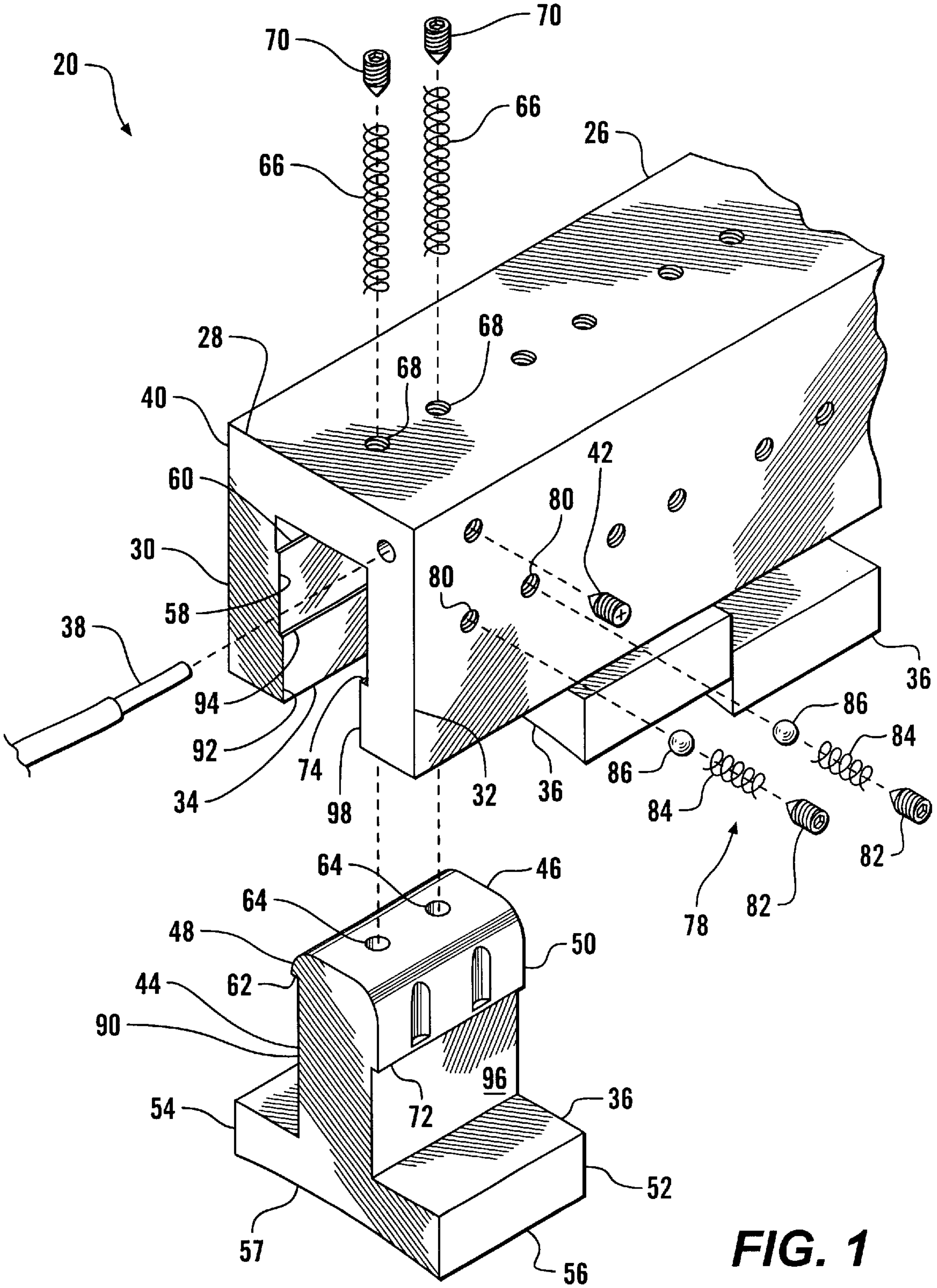
FIG. 1 is fragmentary exploded isometric view of the corona treatment apparatus electrode assembly of this invention.
Figure 3:
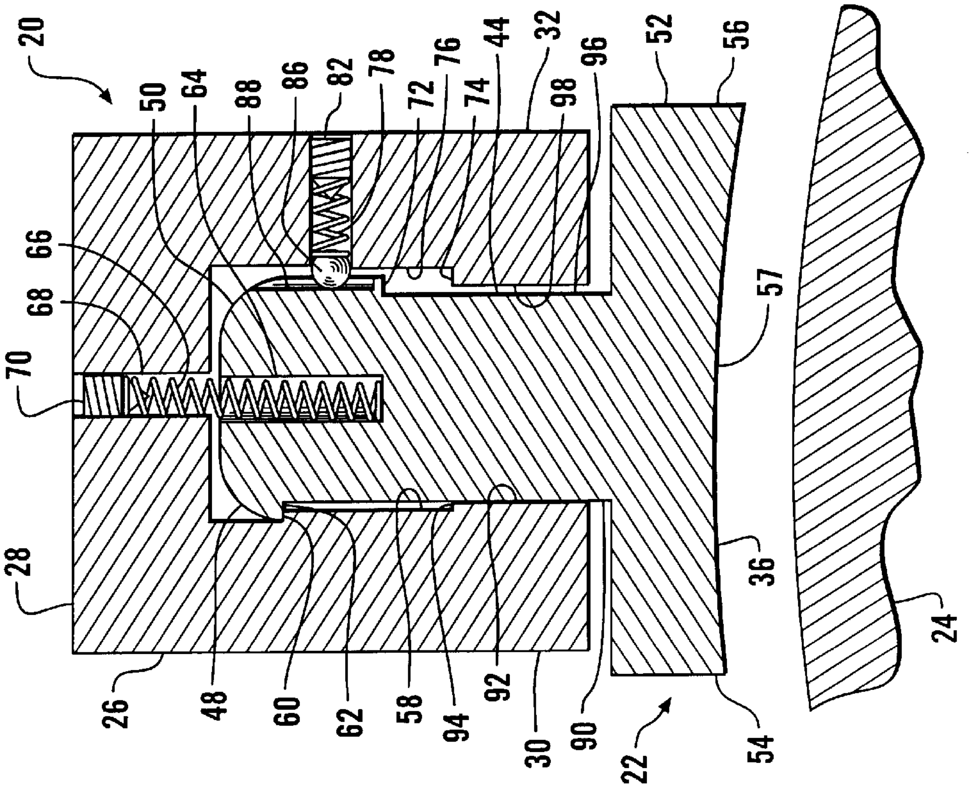
FIG. 3 is a fragmentary cross-sectional view of the electrode assembly of FIG. 2 with the foremost electrode segment in a non-treating position.
Figure 2:
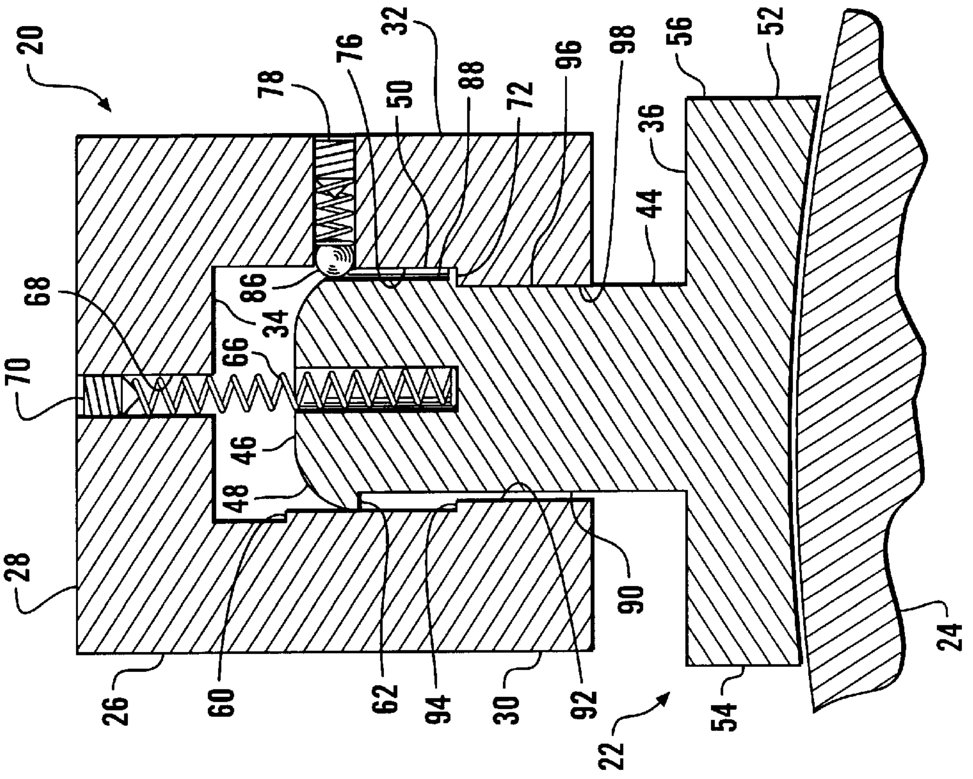
FIG. 2 is a fragmentary cross-sectional view of the electrode assembly of FIG. 1 with the foremost electrode segment in a treating position.
Figure 4:
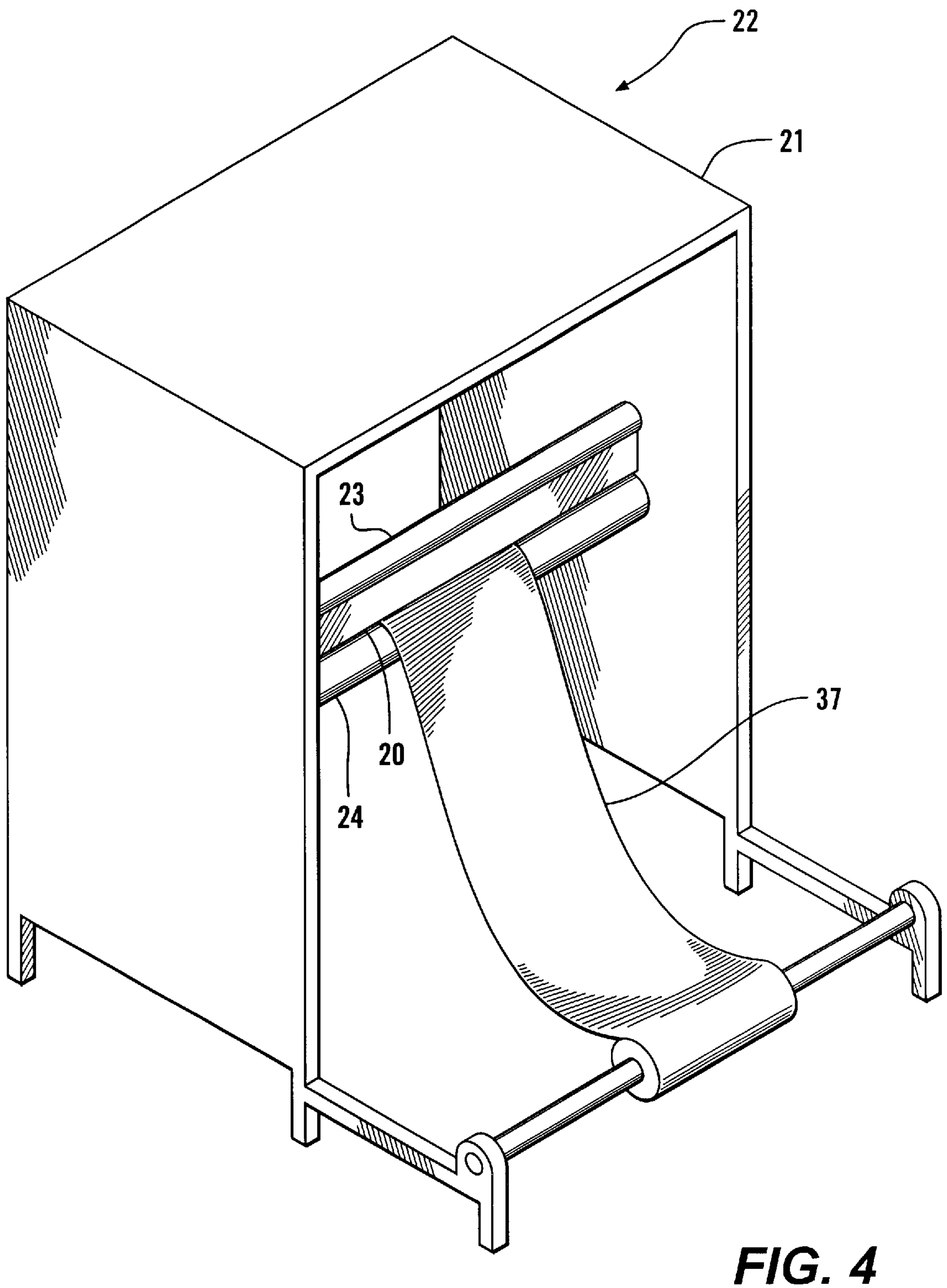
FIG. 4 is a simplified isometric view of a corona treating machine 22 having the segmented electrode assembly of FIG. 1.

Referring more particularly to FIGS. 1–4, wherein like numbers refer to similar parts, there is shown an adjustable segmented electrode assembly 20 in a corona treating machine 22. The electrode assembly 20 is mounted to a frame 21 in fixed relation to a conductive electrode roller 24 as shown in FIGS. 2 and 3, and 4. The electrode roller 24 is a covered cylindrical roll, having a dielectric coating formed of ceramic or silicone. The electrode roller 24 is grounded. For convenient access to the electrode assembly 20, it may be mounted to a cylindrical support beam 23, which can be rotated to bring the electrode assembly away from the electrode roller 24. A substrate 37, typically a web of plastic material is fed between the electrode roller 24 and the electrode assembly 20 for treatment.

The electrode assembly 20 has an axially extending housing 26 which has a top wall 28 with two downwardly extending legs 30, 32 which are spaced from one another to define an axially extending downwardly opening channel 34. The housing is mounted to the frame 21, and is thus fixed with respect to the roller 24 in operation. As shown in FIG. 1, a plurality of conductive electrode segments 36 are received within the housing 26. The housing 26 is formed of an electrically conductive material, such as aluminum, and a voltage is applied to the housing 26 by a conductor 38 which is fastened within an opening in the end face 40 of the housing by a set screw 42. The conductor 38 may be a 14 gauge tin-coated copper wire. The voltage applied to the electrode will typically range from 9600 to 24000 volts. The housing 26 is preferably formed of extruded aluminum, and will typically be 6 inches to 140 inches long. The electrode segments 36 are also extruded of aluminum, and may be about one inch long. The aluminum of both the housing and the electrode segments is alodined.

Each electrode segment 36 has an upwardly extending stem 44 with an upper cap 46 having a first lip 48 which extends to one side of the stem, and a second lip 50 which extends from the other side of the stem, opposite the first lip. A shoe 52 extends from the stem 44 below the housing 26, and has a first flange 54 on the side of the first lip 48, and a second flange 56 on the side of the second lip 50. The shoe 52 is approximately perpendicular to the stem, and the flanges 54, 56 define a curved downwardly opening concave semicylindrical surface 57 which defines a portion of a cylinder with a radius approximately the same as the underlying electrode roller 24. The electrode roller 24 shown is about 6 inches in diameter, but other diameters may be accommodated by forming the segments 36 with a mating diameter semicylindrical surface. The electrode roller 24 will typically be between two inches and 24 inches in diameter.

The electrode segments 36 are adjustably received within the housing 26 to be readily reconfigured from a retracted position, shown in FIG. 3, to an active position, shown in FIG. 2. In the active position, the shoe surface 57 is spaced approximately 0.060 inches from the surface of the electrode roller. In the retracted position, this distance is about 0.260 inches. The electrode housing 26 first leg 30 has portions which define a first channel wall 58 within the channel 34 which faces and abuts the first lip 48 of an electrode segments 36 in the active position. The first channel wall 58 extends downwardly from an outwardly extending first ledge 60. A first lower surface 62 of the first lip 48 engages the first ledge 60 when the electrode segment 36 is in the retracted position, as shown in FIG. 3.

Each electrode segment 36 has at least one, and preferably two upwardly opening bores 64 into which a top tension spring 66 extends. As shown in FIG. 1, each top tension spring 66 extends through a threaded top hole 68 and is held in place by a top set screw 70. The top springs 66 act as spring members which continuously urge the electrode segments into the active position.

In the active position, as shown in FIG. 2, a second lower surface 72 of the second lip 50 engages a second ledge 74 which extends inwardly beneath a second channel wall 76 which is parallel to and facing the first channel wall 58. The electrode segment first lip is urged towards engagement with portions of the housing first leg 30 by at least one, and preferably two, side ball detent assemblies 78. As shown in FIG. 1, the second leg 32 of the housing 26 has a row of threaded side openings 80 into which set screws 82 extend. A spring 84 engages the set screw 82 within the opening 80, and the spring urges a ball bearing 86 inwardly to engage the electrode segment 36. The ball detent assembly 78 balls 86 are received within vertically extending slots 88 in the second lip 50. The engagement of the ball detent assemblies 78 with the vertical slots 88 serves to restrict axial displacement of the electrode segments 36 within the housing 26.

As shown in FIG. 3, when the electrode segment 36 is in a retracted position, a stem first vertical surface 90 which extends below the first lip 48, abuts against a housing first vertical surface 92 which extends below a third ledge 94 positioned beneath the first lip 48. In the retracted position, the ball detent assemblies 78 urge the stem first vertical surface 90 against the housing first vertical surface 92 and retain the electrode segment in its correct vertical orientation. At the same time, the top springs 66 urge the electrode segment downwardly such that the first lip 48 engages the first ledge 60. This engagement restricts further downward movement of the electrode segment 36 and holds the electrode segment in a retracted position.

To bring an individual electrode segment 36 into an active position, it is necessary to dislodge the first lip 48 from its engagement with the first ledge 60. To do this, the entire electrode segment 36 is tilted away from the first leg 30 of the housing 26 by pressing upwardly on the first flange 54 of the shoe 52. This causes the stem to tilt toward the spring detent assemblies 78, depressing them, and forcing the first lip 48 free of the first ledge 60. Once the first lip 48 is no longer in engagement with the first ledge 60, the top springs 66 urge the electrode segment 36 downward until the second lip 50 engages the second ledge 74. The second ledge 74 is positioned at the appropriate height such that the concave underside of the shoe 52 is spaced the appropriate distance from the electrode roller 24. In the active position, the first lip engages against the first channel wall 58 and a stem second vertical surface 96 engages against a second housing vertical surface 98 located beneath the second ledge 74.

As shown in FIG. 3, the spacing of the stem 44 vertical surfaces 90, 96 from one or the other of the housing vertical surfaces 92, 98 need not be large. For example, the difference between the width of the stem 44 and the width of the channel 34 may only be about 0.034 inches. The amount of height adjustment that will be obtained by depressing the segment 36 will be the distance between the second ledge 74 and the first ledge 60, less the distance between the first lower surface 62 and the second lower surface 72, for example this may be about 0.16 inches.

In practice, the adjustable segmented electrode assembly 20 makes for very rapid set up of a corona treating apparatus. It is only necessary to shut off the current to the electrode, pivot it upwardly on the support beam 23, and then, without the assistance of tools, the operator can simply press on the desired segment 36 to configure the apparatus to give treatment only to the desired regions of the substrate 37 as it passes over the electrode roller 24 and beneath the segmented electrode assembly.

It will be noted that the cap 46 is wider than the bottom opening of the channel in the housing 26, and hence it is not possible for the electrode segments to fall out or be removed directly downwardly. Instead, during assembly or repair, the electrode segments must be removed axially.

Although only a fragmentary length of the adjustable segmented electrode assembly 20 is shown in FIG. 1, it will be understood that a multiplicity of segments, each about one inch long, may be employed to work with an electrode roller that is twenty, thirty, or more inches long. In addition, the adjustable segments may be used in conjunction with non-adjustable or fixed portions of electrode, not shown.

In an alternative embodiment, the electrode assembly may be used in conjunction with a a bare electrode roller, which does not have a dialectric coating. In that case, each electrode segment shoe may have a dialectric material applied thereto, such as ceramic or silicone.

It is understood that the invention is not limited to the particular construction and arrangement of parts herein illustrated and described, but embraces all such modified forms thereof as come within the scope of the following claims.

I claim:

1. A corona treating apparatus for corona treatment of a substrate, the apparatus comprising:

a frame;

an electrode roller mounted to the frame, and over which a substrate travels; and a segmented electrode mounted to the frame, wherein the segmented electrode comprises a plurality of electrode segments retained within an axially extending housing positioned above the electrode roller, the housing having a downwardly opening channel through which portions of the electrode segments protrude, wherein each electrode segment is selectably moveable with respect to the housing between a first position in which said electrode segment is in close proximity to the electrode roller so as to corona treat a region of the substrate, and a second position in which said electrode segment is spaced a greater distance from the roller than in the first position such that corona treatment does not take place at said electrode segment; and a plurality of top springs, wherein a top spring extends between each electrode segment and the housing, to continuously urge said electrode segment downward toward the electrode roller in both the first position and the second position, each electrode segment having a first projecting portion which engages which a first portion of the housing in the first position, and second projecting portion, spaced from the first projecting portion, which engages with a second portion of the housing in the second position.

2. The apparats of claim 1 further comprising a plurality of side spring members, each side spring member extending between the housing and one of the plurality of electrode segments, to urge the first projecting portion into engagement with the first portion of the housing.

3. The electrode of claim 2 wherein each side spring member comprises a spring and a ball; and wherein each electrode segment has an upper cap, portions of which define at least one upwardly extending slot within which said ball engages to restrict axial movement of the segment within the housing.

4. The electrode of claim 1 wherein each electrode segment has a shoe which extends below the housing, said shoe having portions defining a downwardly opening concave semicylindrical surface.

5. The electrode of claim 1 further comprising a ceramic material applied to the shoe of each electrode segment.

6. An electrode for a corona treating apparatus for corona treatment of a substrate, the electrode comprising an electrode housing extending along an axis;

portions of the electrode housing defining an axially extending downwardly opening channel;

a plurality of electrode segments, wherein each segment has an upwardly extending stem with a cap which has a first lip which extends to one side of the stem, and a second lip which extends to the other side of the stem, opposite the first lip, and a shoe extends sidewardly from the stem below the cap;

portions of the electrode housing which define a first channel wall within the channel, the first channel wall extending downwardly from a first ledge which extends into the channel, the first ledge and the first channel wall facing the first lips of the electrode segments;

portions of the electrode housing which define a second channel wall within the channel and facing the first channel wall, the second channel wall extending upwardly from a second ledge which extends into the channel;

wherein each electrode segment has at least one top spring member engaged therewith which urges the electrode segment downwardly, and at least one side spring member which urges the electrode segment toward the first channel wall, wherein in a retracted position, each electrode segment first lip engages the first ledge, and in an active position, each electrode segment second lip engages the second ledge.

7. The electrode of claim 6 wherein the at least one side spring member comprises a spring and a ball; and wherein portions of the electrode cap second lip define at least one upwardly extending slot within which said ball engages to restrict axial movement of the segment within the housing.

8. The electrode of claim 6 wherein the electrode shoe has portions defining a downwardly opening concave semicylindrical surface.

9. The electrode of claim 6 further comprising a ceramic material applied to the shoe of each electrode segment.

10. An electrode for a corona treating apparatus for corona treatment of a substrate, the electrode comprising an electrode housing extending along an axis;

portions of the electrode housing defining an axially extending downwardly opening channel;

a plurality of electrode segments, wherein each segment has an upwardly extending stem with a first lip which extends to one side of the stem, and a second lip which extends to the other side of the stem, opposite the first lip, and a shoe extends from the stem below the housing approximately perpendicular to the stem;

portions of the electrode housing which define a first channel wall within the channel, the first channel wall extending downwardly from a first ledge which extends into the channel, the first ledge and the first channel wall facing the first lips of the electrode segments;

portions of the electrode housing which define a second channel wall within the channel and facing the first channel wall, the second channel wall extending upwardly from a second ledge which extends into the channel, the second ledge being positioned below the first ledge;

wherein each electrode segment is urged downwardly by at least one spring member engaged therewith, and each electrode segment is urged toward the first channel wall by at least one side spring member, wherein in a retracted position, each electrode segment first lip engages the first ledge, and in an active position, each electrode segment second lip engages the second ledge.

11. The electrode of claim 10 wherein the at least one side spring member comprises a spring and a ball; and wherein portions of the electrode cap second lip define at least one upwardly extending slot within which said ball engages to restrict axial movement of the segment within the housing.

12. The electrode of claim 10 wherein each electrode shoe has portions defining a downwardly opening concave semicylindrical surface.

13. The electrode of claim 10 further comprising a ceramic material applied to the shoe of each electrode segment.

* * * * *